US012491962B2

(12) United States Patent
Nakajima et al.

(10) Patent No.: US 12,491,962 B2
(45) Date of Patent: *Dec. 9, 2025

(54) VEHICLE

(71) Applicant: KAWASAKI MOTORS, LTD., Akashi (JP)

(72) Inventors: Takeshi Nakajima, Akashi (JP); Hiroshi Ishii, Akashi (JP); Taro Iwamoto, Akashi (JP); Kazuya Nagasaka, Akashi (JP); Taichi Inaba, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 744 days.

This patent is subject to a terminal disclaimer.

(21) Appl. No.: 17/757,964

(22) PCT Filed: Dec. 9, 2020

(86) PCT No.: PCT/JP2020/045862
§ 371 (c)(1),
(2) Date: Jun. 24, 2022

(87) PCT Pub. No.: WO2021/131702
PCT Pub. Date: Jul. 1, 2021

(65) Prior Publication Data
US 2023/0037344 A1 Feb. 9, 2023

(30) Foreign Application Priority Data
Dec. 26, 2019 (JP) ................. 2019-236731

(51) Int. Cl.
B62K 25/08 (2006.01)
B62K 5/08 (2006.01)

(52) U.S. Cl.
CPC ............... *B62K 25/08* (2013.01); *B62K 5/08* (2013.01)

(58) Field of Classification Search
CPC .................................. B62K 25/08; B62K 5/08
See application file for complete search history.

(56) References Cited

U.S. PATENT DOCUMENTS 6,357,775 B1 * 3/2002 Iwai ...................... B62K 25/24
180/219
2019/0016405 A1 1/2019 Huang

FOREIGN PATENT DOCUMENTS

DE 4435481 A1 * 4/1996 ............. B62K 21/20
EP 3581477 12/2019
(Continued)

Primary Examiner — Jacob D Knutson
(74) Attorney, Agent, or Firm — Fay Kaplun & Marcin, LLP

(57) ABSTRACT

A leaning vehicle includes a vehicle body, a left front wheel, a right front wheel, a lean mechanism, and a suspension. The left front wheel is positioned on the first side (left side) in the vehicle width direction. The right front wheel is positioned on the second side (right side) opposite to the first side in the vehicle width direction. The lean mechanism connects the left front wheel and the right front wheel and vertically vibrates integrally with both of the left front wheel and the right front wheel. The suspension is positioned so as to overlap the center of the vehicle in the vehicle width direction, connects the lean mechanism to the vehicle body, and reduces vibration transmitted from a road surface to the vehicle body via the left front wheel and the right front wheel.

8 Claims, 9 Drawing Sheets

(56) References Cited

FOREIGN PATENT DOCUMENTS

| | | | | |
|---|---|---|---|---|
| JP | 2004276795 A | * | 10/2004 | |
| JP | 2012006539 A | | 1/2012 | |
| JP | 2018538198 A | | 12/2018 | |
| JP | 2019018843 | | 2/2019 | |
| JP | 2019156316 A | | 9/2019 | |
| JP | 2019214300 A | * | 12/2019 | ............. B62K 5/027 |
| WO | WO-2014065396 A1 | * | 5/2014 | ............... B62K 5/08 |
| WO | WO-2017086351 A1 | * | 5/2017 | ........... B60G 17/015 |

* cited by examiner

VEHICLE

PRIORITY DATA

The present application is a 371 application of PCT Patent Application Serial No. PCT/JP2020/045862 filed on Dec. 9, 2020 which claims priority to Japanese Patent Application Serial No. 2019-236731 filed on Dec. 26, 2019. The disclosure of the above applications is incorporated herein by reference.

TECHNICAL FIELD

The present invention relates mainly to a vehicle having two front wheels.

BACKGROUND ART

Patent Literature 1 (PTL 1) discloses a three-wheeled vehicle including two front wheels and one rear wheel. The vehicle includes suspensions for reducing vibrations transmitted from front wheels to a vehicle body. Each of the suspensions is disposed near the left and right front wheels.

CITATION LIST

Patent Literature

PTL 1: Japanese Patent Application Laid-Open No. 2018-538198

SUMMARY OF INVENTION

Since the suspensions are individually disposed left and right front wheels in the vehicle of PTL 1, an attachment structure of the suspensions tends to be complicated. When the suspensions are disposed near the front wheels, the space near the front wheels tends to be narrow.

The present invention is made in view of the circumstances described above, and aims primarily to provide a vehicle having two front wheels and a configuration that can simplify a suspension attachment structure and secure space near the front wheels.

The present invention relates to a vehicle having the following configuration.

An aspect of the present invention provides a vehicle having the following configuration. The vehicle includes a vehicle body, a first front wheel, a second front wheel, a first mechanism, and a suspension. The first front wheel is positioned on a first side in a vehicle width direction. The second front wheel is positioned on a second side opposite to the first side in the vehicle width direction. The first mechanism connects the first front wheel and the second front wheel and vertically vibrates integrally with both of the first front wheel and the second front wheel. The suspension is positioned so as to overlap a center of the vehicle in the vehicle width direction, connects the first mechanism to the vehicle body, and reduces vibration transmitted from a road surface to the vehicle body via the first front wheel and the second front wheel.

This simplifies the structure compared to a configuration in which the suspension is attached separately to the first front wheel and the second front wheel. Since the first mechanism exists between the front wheel and the suspension, the suspension can be disposed so as to overlap the center of the vehicle in the vehicle width direction, and thus a space near the front wheels can be secure.

According to the present invention, one of the advantages is a suspension attachment structure can be simplified and secure space near the front wheels.

DETAILED DESCRIPTION

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load.

Figure 1:
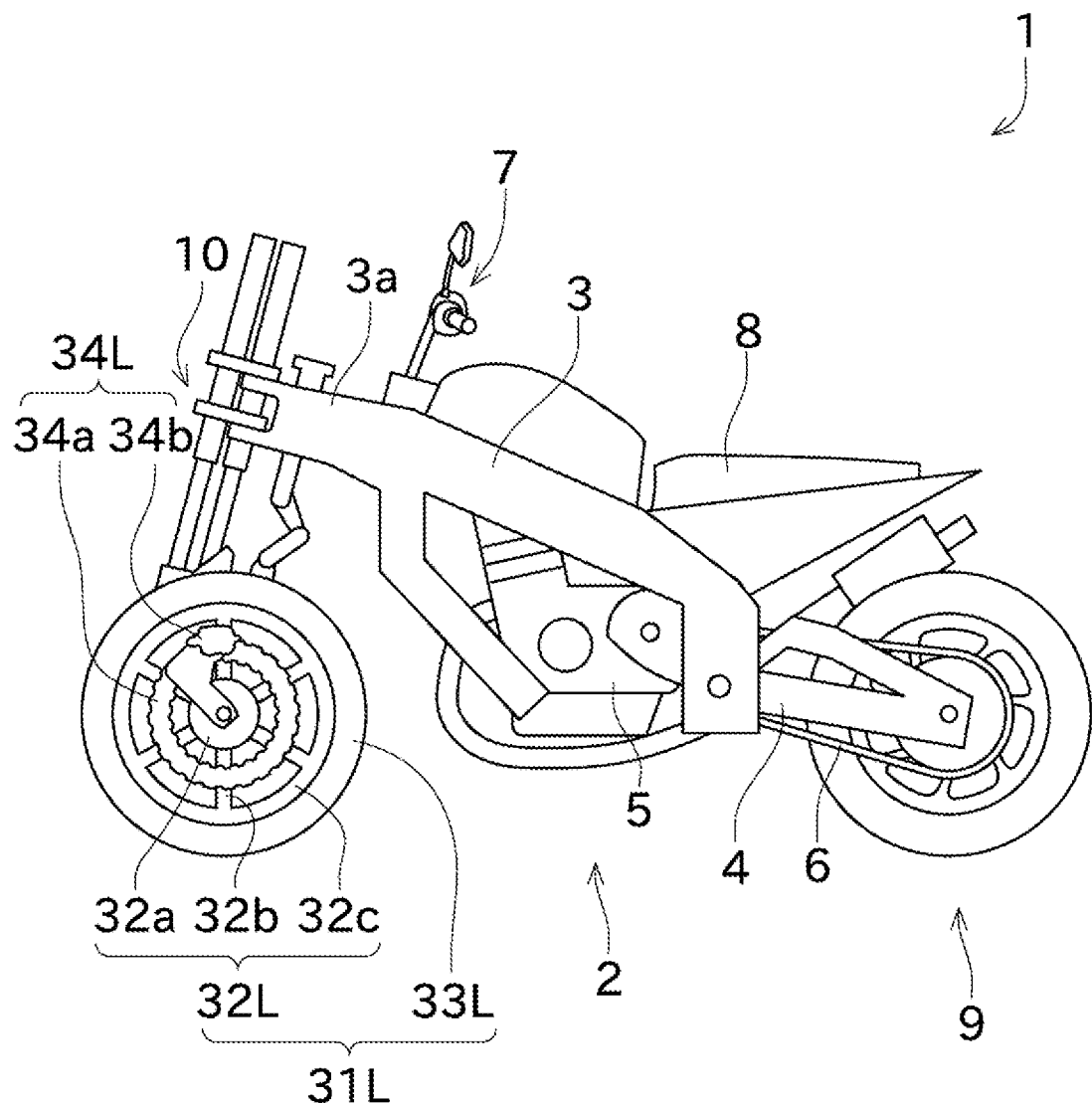
FIG. 1 shows a side view of a leaning vehicle according to a first embodiment of the present invention.
Figure 2:
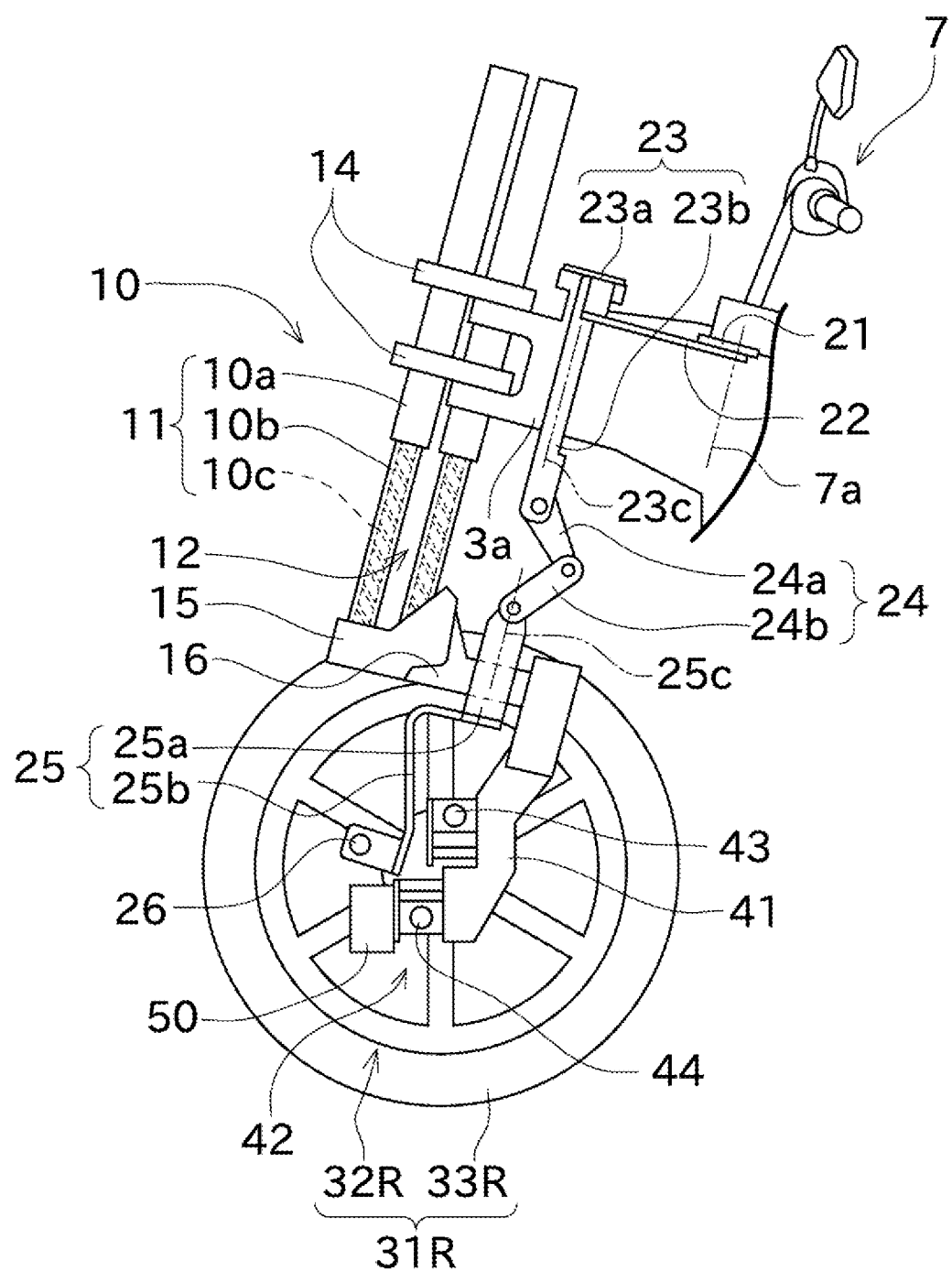
FIG. 2 shows a side view of a front portion of the leaning vehicle.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3. Details of how the left front wheel 31L and the right front wheel 31R are attached will be given later.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 3:
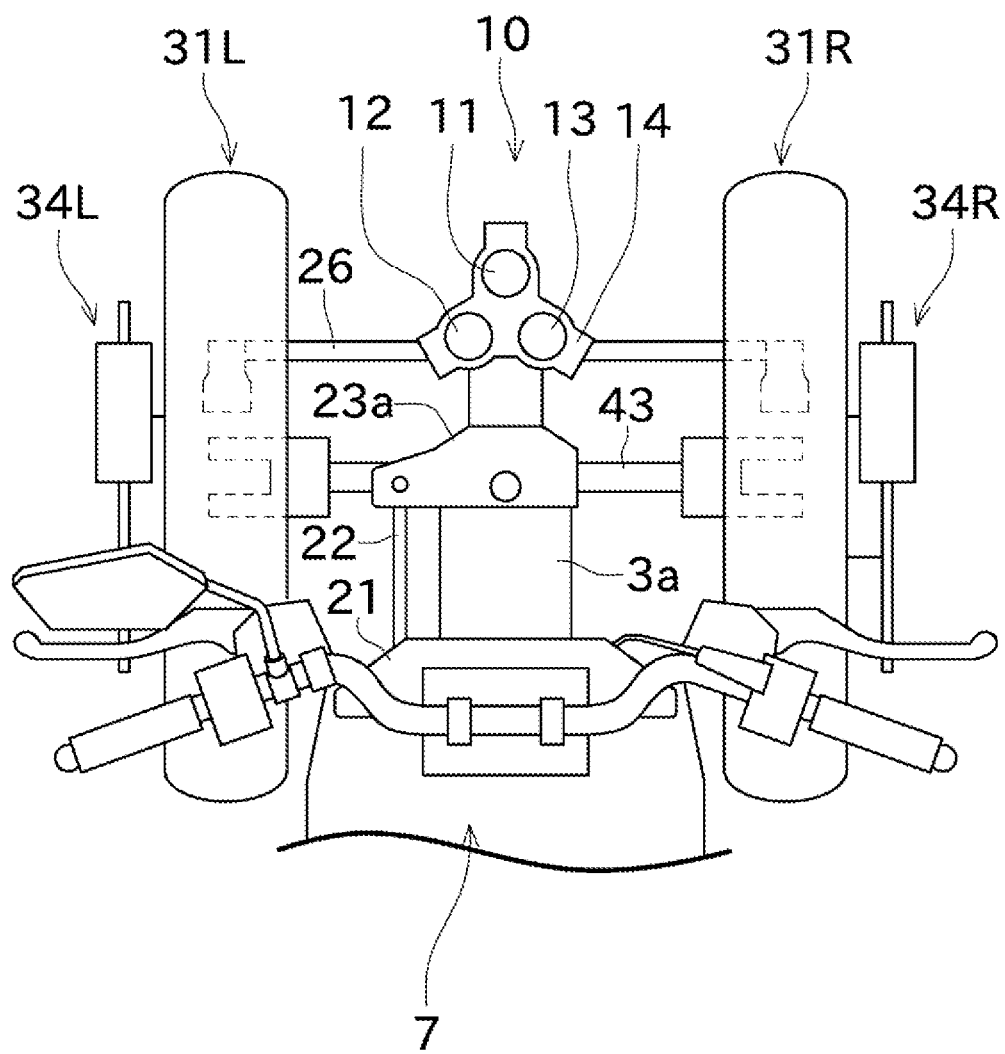
FIG. 3 shows a plan view of the front portion of the leaning vehicle.

A front suspension 10 included in the leaning vehicle 1 will now be described with reference to FIG. 2 and FIG. 3.

The suspension 10 couples the vehicle body 2 to the left front wheel 31L and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. In the description below, a member attached on the side close to the left front wheel 31L and the right front wheel 31R (the side where vibrations occur) relative to the suspension 10 will be referred to as "vibration side member". A member attached on the side close to the vehicle body 2 (the side where vibration damping is made) relative to the suspension 10 will be referred to as "vibration-damping side member".

The suspension 10 includes a first tubular suspension 11, a second tubular suspension 12, and a third tubular suspension 13. In the following, the first tubular suspension 11, the second tubular suspension 12, and the third tubular suspension 13 will be collectively called "tubular suspensions 11, 12, and 13". The tubular suspensions 11, 12, and 13 have the same configuration. The configurations of the tubular suspensions 11, 12, and 13 are identical to the configuration of a front fork that is generally adopted in a motorcycle. The suspension 10 is not limited to a front fork type.

Each of the tubular suspensions 11, 12, and 13 includes a tubular body 10a, a sliding body 10b, and a spring 10c.

The tubular body (outer tube) 10a is an elongated tubular member. The tubular body 10a has the sliding body (inner tube) 10b received therein. The sliding body 10b is an elongated tubular member having a diameter smaller than that of the tubular body 10a. The sliding body 10b is capable of moving along its longitudinal direction relative to the tubular body 10a. The sliding body 10b has the spring 10c received therein. The tubular body 10a and the sliding body 10b are connected via the spring 10c. With this configuration, vibrations transmitted from the sliding body 10b to the tubular body 10a can be reduced. Oil is encapsulated in the suspension 10, and a movement of the sliding body 10b relative to the tubular body 10a causes a movement of the oil. The movement of the oil produces a resistance force (damping force), which can damp the vibrations in a short time.

In this embodiment, the tubular body 10a is disposed more upward than the sliding body 10b, and basically, the above-mentioned "vibration-damping side member" vibrates integrally with the tubular body 10a. The sliding body 10b is disposed more downward than the tubular body 10a. Basically, the above-mentioned "vibration side member" vibrates integrally with the sliding body 10b. Which one of the tubular body 10a and the sliding body 10b is disposed more upward or more downward than the other may be reversed.

The respective sliding bodies 10b of the tubular suspensions 11, 12, and 13 are configured to slide integrally. To be specific, the suspension 10 includes an upper coupling member 14 and a lower coupling member 15.

The upper coupling member 14 couples the respective tubular bodies 10a of the tubular suspensions 11, 12, and 13. This makes it impossible for the respective tubular bodies 10a of the tubular suspensions 11, 12, and 13 to move relative to one another, and thus the tubular bodies 10a can be integrated. At least one of the tubular bodies 10a of the tubular suspensions 11, 12, and 13 is attached to a front frame 3a disposed in a front portion of the vehicle body frame 3.

The lower coupling member 15 couples the respective sliding bodies 10b of the tubular suspensions 11, 12, and 13. This makes it impossible for the respective sliding bodies 10b of the tubular suspensions 11, 12, and 13 to move relative to one another, and thus allows the sliding bodies 10b to slide integrally. At least one of the sliding bodies 10b of the tubular suspensions 11, 12, and 13 is attached to a lower coupling base 16. The left front wheel 31L and the right front wheel 31R are attached to the lower coupling base 16 via the later-described mechanism.

Outline of the front wheel will now be described with reference to FIG. 1 and FIG. 2.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake 34R, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc 34a, which is attached to the left wheel 32L, into a brake caliper 34b. It may be also acceptable that the left brake 34L is attached more inward than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Attached to the left wheel 32L is a left arm 45 as a left knuckle member. An outer end portion of the above-mentioned steering rod 26 in the vehicle width direction is rotatably attached to the left arm 45. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified.

A mechanism for transmitting a rotational steering force applied by the driver will now be described with reference to FIG. 2 and FIG. 5.

Disposed below the steering handle 7 is a rear bracket 21. The steering handle 7 and the rear bracket 21 are coupled by a fixture, for example. The steering handle 7 and the rear bracket 21 are integrally rotatable about a steering rotation axis 7a (a line substantially parallel to the upper-lower direction). A rotation angle of the steering handle 7 about the steering rotation axis 7a may sometimes be referred to as maneuvering angle.

The rear end of a transmission arm (rotation transmission part) 22 is rotatably attached to the rear bracket 21. The transmission arm 22 connects the rear bracket 21 to a first steering part 23. The transmission arm 22 transmits a rotational steering force applied to the steering handle 7 to the first steering part 23.

The first steering part 23 is disposed more frontward than the rear bracket 21 and the steering handle 7. The first steering part 23 is disposed so as to overlap the center in the vehicle width direction. The first steering part 23 is rotatably attached to the front frame 3a.

The first steering part 23 includes a front bracket 23a and a pantograph attachment part 23b. The front bracket 23a and the pantograph attachment part 23b are connected by a fixture, for example. The front bracket 23a and the pantograph attachment part 23b are integrally rotatable about a first rotation axis 23c (a line substantially parallel to the upper-lower direction).

A front end of the transmission arm 22 is attached to the front bracket 23a. This configuration allows the first steering part 23 to rotate as the steering handle 7 and the rear bracket 21 rotate. In this embodiment, the transmission arm 22 is provided only on the first side, the transmission arm 22 may be provided on both sides in the vehicle width direction.

The pantograph attachment part 23b has a pair of left and right elongated arms which extend along the first rotation axis 23c. The arms are positioned at an interval from the front frame 3a and sandwich the front frame 3a in the vehicle width direction. This allows the pantograph attachment part 23b to rotate without interfering with the front frame 3a. The pantograph attachment part 23a includes a portion that is positioned lower than the front frame 3a, is connected to the left and right arms, and overlaps the center of the vehicle in the vehicle width direction. Attached to the portion is a pantograph mechanism (a deformation transmitter) 24.

The pantograph mechanism 24 is positioned so as to overlap the center in the vehicle width direction. The pantograph mechanism 24 includes a first link portion 24a and a second link portion 24b. The first link portion 24a is attached to the first steering part 23 (specifically, pantograph attachment part 23b) so as to be rotatable about the vehicle width direction. The second link portion 24b is attached to a later-described second steering part 25 so as to be rotatable about the vehicle width direction. The second steering part 25 is a "vibration side member". The first link portion 24a and the second link portion 24b are coupled to each other so as to be rotatable about the vehicle width direction.

With the configuration described above, the first steering part 23 and the second steering part 25 can be kept coupled even if a relative distance between the first steering part 23 and the second steering part 25 is changed. Accordingly, transmission of the rotational steering force remains enabled even though the suspension 10 expands or contracts because of, for example, unevenness of the road surface.

The suspension 10 is disposed nearly in front of the pantograph mechanism 24. Thus, when the pantograph mechanism 24 is in operation, it is necessary that the first link portion 24a or the second link portion 24b should not collide with the suspension 10. In this regard, in this embodiment, a connection point of the first link portion 24a and the second link portion 24b is positioned rearward than the first rotation axis 23c. That is, the pantograph mechanism 24 protrudes rearward (i.e., on the opposite side of the suspension 10) when a relative distance of the first steering part 23 and the second steering part 25 becomes short. Therefore, the collision does not occur when the pantograph mechanism 24 approaches the suspension 10.

The first link portion 24a may consist of one member or two members disposed in the vehicle width direction (that is the same as the second link portion 24b). The pantograph mechanism 24 of this embodiment consists of two links, but may consist of three or more links. The links may be plate-shaped, rod-shaped, or block-shaped as long as it can be transmit power. Instead of the pantograph mechanism, other mechanisms (for example, a mechanism in which a first member slides with respect to a second member)

The second steering part 25 is positioned so as to overlap the center in the vehicle width direction. The second steering part 25 transmits a rotational steering force received via the pantograph mechanism 24 to the steering rod 26. The second steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The second steering part 25 rotates in accordance with steering, while the lower coupling base 16 does not rotate in accordance with steering. Accordingly, the second steering part 25 is attached so as to be rotatable relative to the lower coupling base 16.

Figure 4:
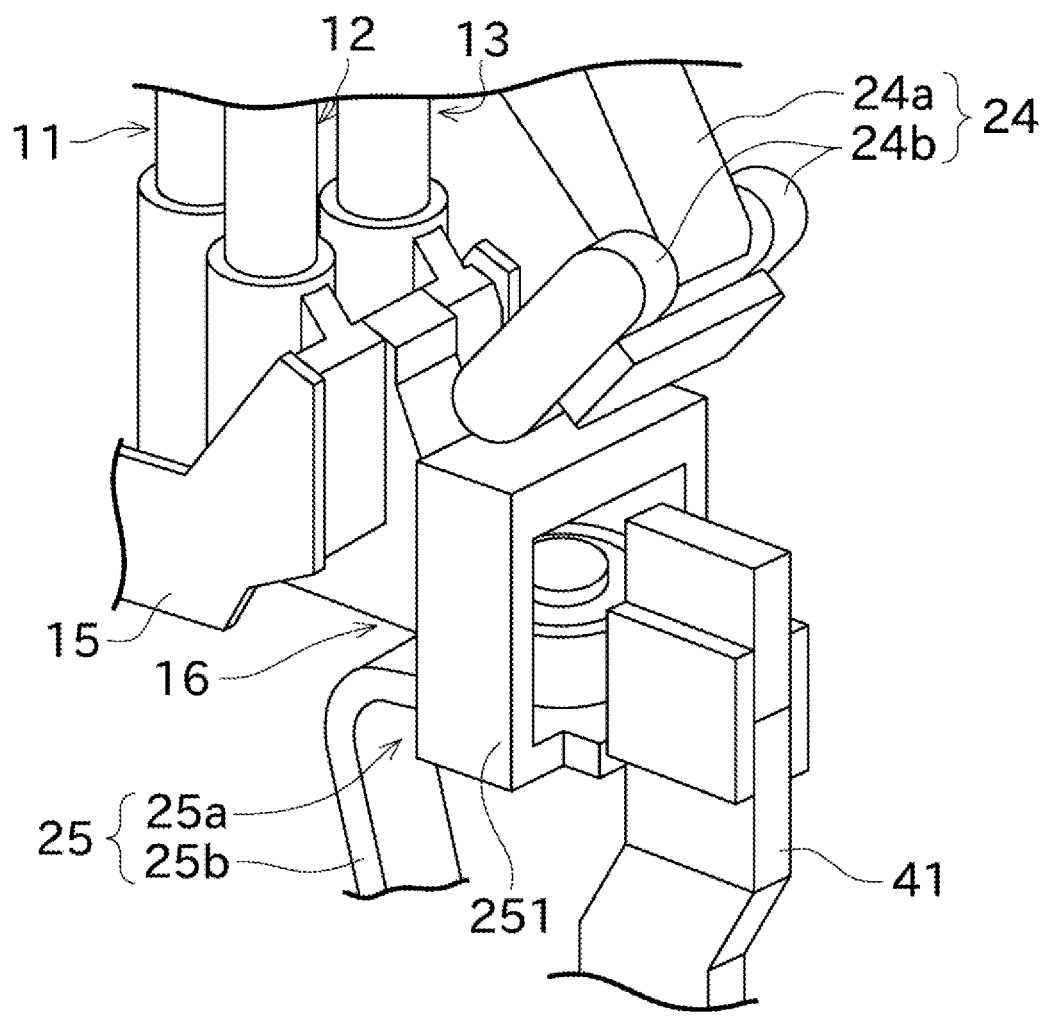
FIG. 4 shows an enlarged perspective view of a suspension, a pantograph mechanism, and a lean base.

The suspension attaching portion 25a and the lower coupling base 16 are disposed so as to intersect each other in the side view. Specifically, as shown in FIG. 4, the suspension attaching portion 25a includes a frame member 251 that is rectangular-shaped and frame-shaped. A part of the lower coupling base 16 is positioned in a center space of the frame member 251, and the frame member 251 is rotatably attached to the lower coupling base 16. Since both the lower coupling base 16 and the suspension attaching portion 25a are positioned so as to overlap the center in the vehicle width direction, it is necessary to prevent interference between their positions of both parts. In this regard, in this embodiment, a configuration in which the lower coupling base 16 passes through the frame member 251 prevents interference of both parts.

The rod attaching portion 25b is attached to a lower portion of the suspension attaching portion 25a. The rod attaching portion 25b has a substantially L-like shape including a portion that extends frontward from the suspension attaching portion 25a and a portion that extends downward. With this configuration, a space can be formed below the suspension attaching portion 25a. In this space, a part of the later-described lean mechanism 42 is disposed.

The suspension attaching portion 25a and the rod attaching portion 25b are connected by a fixture or the like and integrally rotatable. In other words, the second steering part 25 is integrally rotatable about a second rotation axis 25 as shown in FIG. 2 (a line substantially parallel to the upper-lower direction).

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more frontward than the axle). The right end of the steering rod 26 is attached to the right front wheel 31R (more specifically, to a portion of the right front wheel 31R more frontward than the axle). A rotational steering force applied by the driver causes the rod attaching portion 25b to rotate about the second rotation axis 25c, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

In this embodiment, the first rotation axis 23c and the second rotation axis 25c are coincident. Accordingly, a distance of the maneuvering angle (a rotation angle of the steering handle 7) and the actual steering angle (a rotation angle of the left front wheel 31L and the right front wheel 31R) is hardly generated. Therefore, operability of a driver can be high.

The smaller angle of angles between the first rotation axis 23c and the upper-lower direction is a caster angle. The caster angle affects the traveling or operating of the leaning vehicle 1. Thus, the caster angle is adopted according to the application or purpose of the leaning vehicle 1. The leaning vehicle 1 of this embodiment employs a relatively small caster angle. In this embodiment, since the left front wheel 31L/the right front wheel 31R and the steering handle 7 are relatively far apart in the front-rear direction, the caster angle tends to be large. However, by transmitting the rotational steering force via the first steering part 23, the caster angle can be small without changing positions of the left front wheel 31L/the right front wheel 31R and the steering handle 7. The first steering part 23 may be omitted.

The steering rod 26 includes a mechanism for adjusting a toe angle. The toe angle is an angle formed by the left front wheel 31L and the front-rear direction or the right front wheel 31R and the front-rear direction in the plan view when the maneuvering angle is neutral. For example, toe-in is a state in which the distance between the front ends of the left front wheel 31L and the right front wheel 31R is shorter than the distance between their rear ends in the plan view. Toe-out is a state in which the distance between the front ends of the left front wheel 31L and right front wheel 31R is longer than the distance between their rear ends in the plan view.

Figure 5:
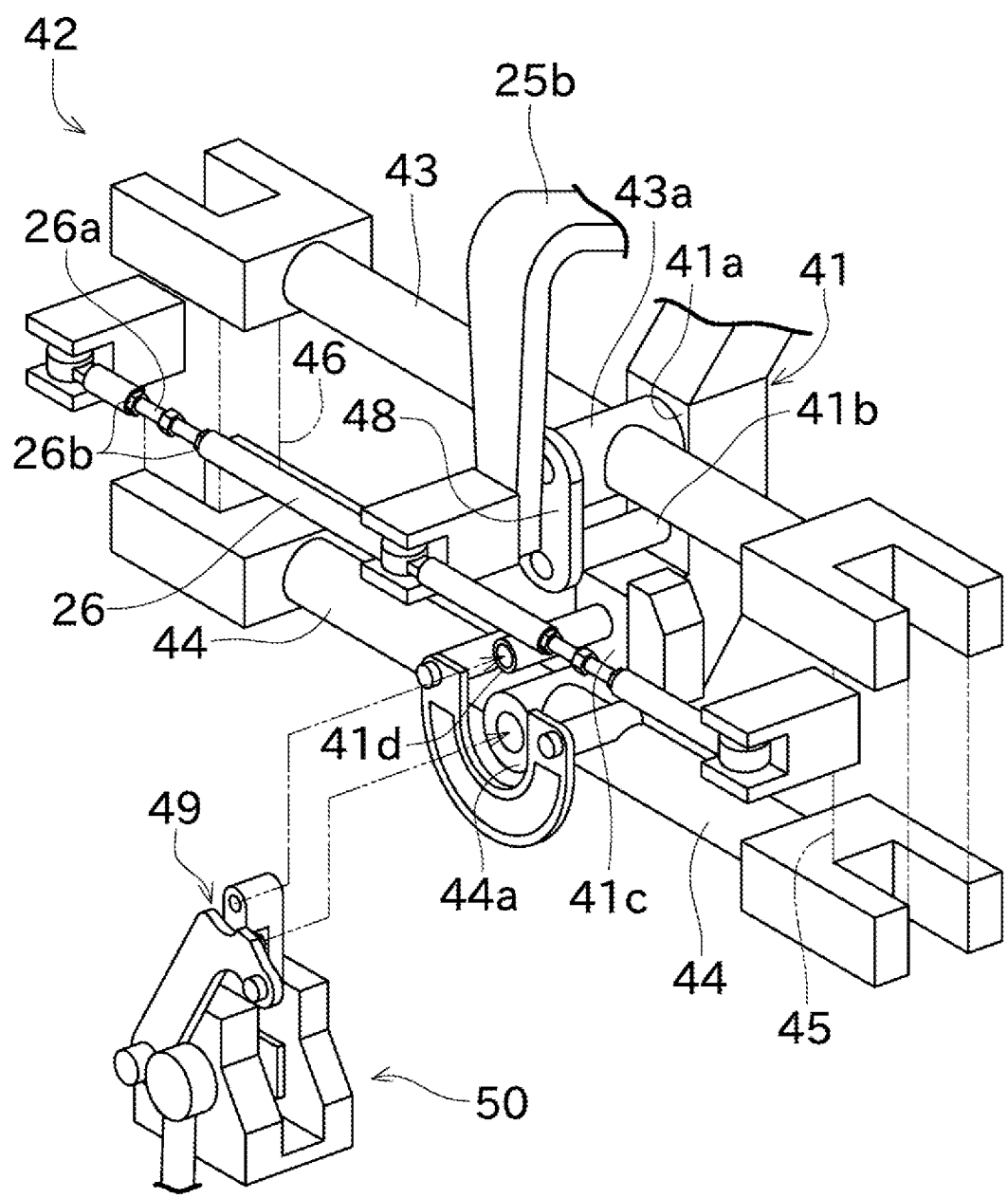
FIG. 5 shows a perspective view of a lean mechanism.

As shown in FIG. 5, the steering rod 26 includes a threaded shaft 26a and an adjusting nut 26b. The adjusting nut 26b is attached to the threaded shaft 26a. By rotating the adjusting nut 26b with respect to the threaded shaft 26a and moving along the axial direction, the length of the steering rod 26 can be changed. Since the steering rod 26 is positioned at forward of the axle, shortening the length of the steering rod 26 results in toe-in, and longing the length of the steering rod 26 results in toe-out. In order to adjust the toe angle of the leaning vehicle 1 into exactly 0 degree, the length of the steering rod 26 can be changed.

In particular, the steering rod 26 of this embodiment has an adjusting mechanism (threaded shaft 26a and adjusting nut 26b) at left side and right side with respect to the center in the vehicle width direction. Therefore, the toe angles of the left front wheel 31L and the right front wheel 31R can be adjusted individually.

Figure 6:
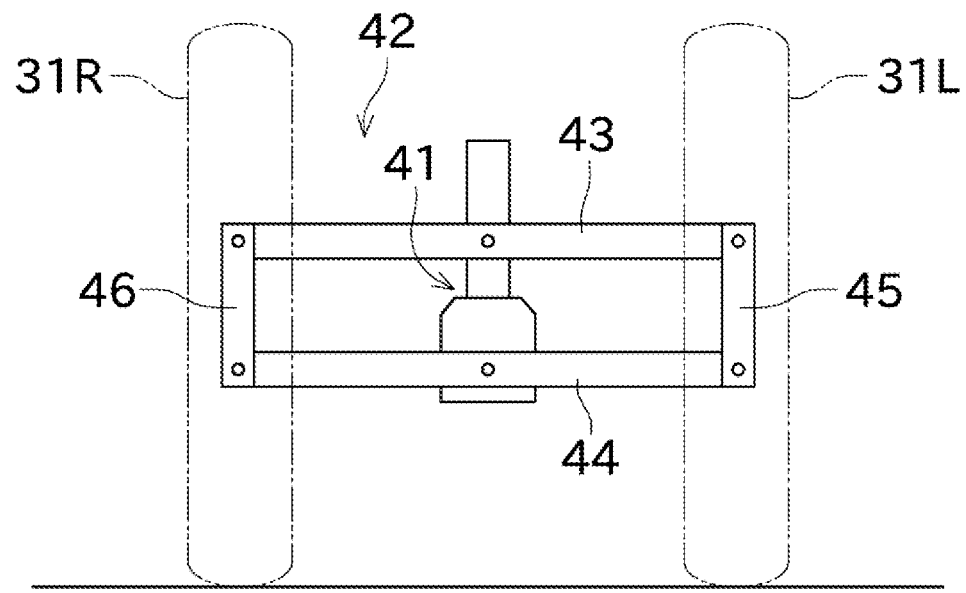
FIG. 6 shows a schematic front view illustrating a leaning operation.
Figure 6:
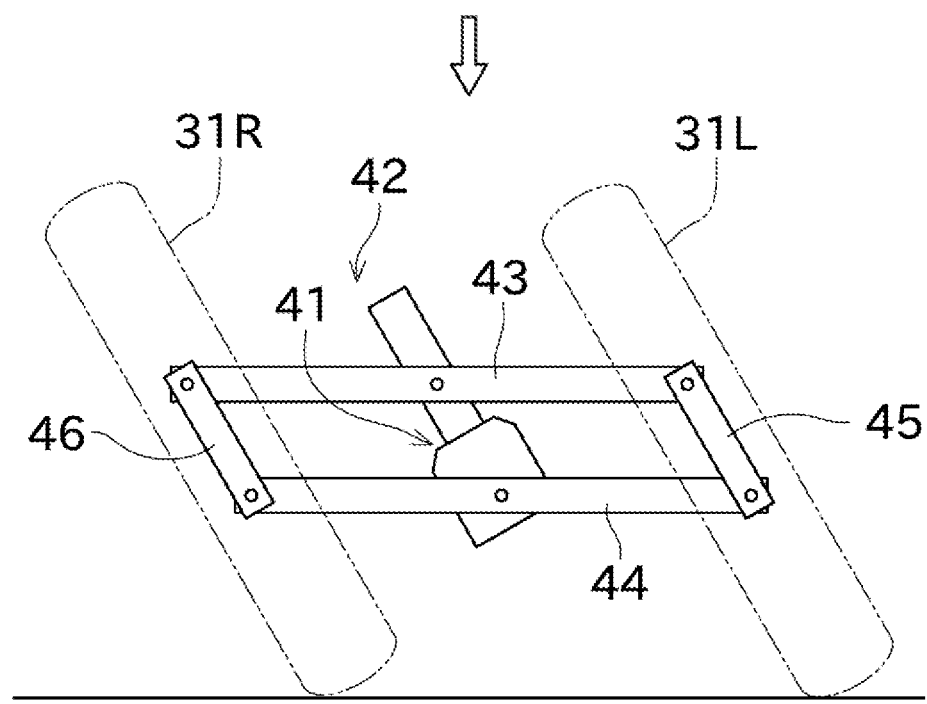

A lean mechanism 42 will now be described with reference to FIG. 5 and FIG. 6.

In the description of the lean mechanism 42, being rotatably attached means being attached so as to be capable of relative rotation about the front-rear direction.

Attached to a rear portion of the lower coupling base 16 is a lean base 41 extending downward from the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 and the lean mechanism 42, which are attached to the lower coupling base 16, are "vibration side members". The lean base 41 and the lean mechanism 42 are arranged at a relatively low position (a position where they are partially or entirely overlap the left front wheel 31L in a side view). With this, heavy parts can be arranged at a low position, and therefore the leaning vehicle 1 can be stabilized.

The lean base 41 includes an upper attaching portion 41a and a lower attaching portion 41c. The upper attaching portion 41a and the lower attaching portion 41c are formed on surfaces on the front side (one side in the front-rear direction, hereinafter the same). The upper attaching portion 41a is disposed more upward and more rearward than the lower attaching portion 41c. The upper attaching portion 41a has an upper protruding tube 41b protruding frontward. The lower attaching portion 41c has a lower protruding tube 41d protruding frontward. Here, it should be noted that the lean base 41 may have a configuration other than the first embodiment, as illustrated in a second embodiment which will be described later.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a. The upper fulcrum portion 43a has the front end to which a coupling link 48 is rotatably attached. The coupling link 48 is rotatably attached not only to the front end of the upper fulcrum portion 43a but also to the front end of the upper protruding tube 41b. As a result, the upper arm 43 can be supported in a manner of being sandwiched between the lean base 41 and the coupling link 48 in the front-rear direction, so that the upper arm 43 can be supported more stably as compared to cantilevered supporting. The upper protruding tube 41b and the coupling link 48 may be omitted.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c. The lower fulcrum portion 44a has the front end to which a lean bracket 49 is rotatably attached. The lean bracket 49 is rotatably attached not only to the front end of the lower fulcrum portion 44a but also to the front end of the lower protruding tube 41d. As a result, the lower arm 44 can be supported in a manner of being sandwiched between the lean base 41 and the lean bracket 49 in the front-rear direction, so that the lower arm 44 can be supported more stably as compared to cantilevered supporting.

The lean bracket 49 of this embodiment has a function for attaching not only the lower arm 44 but also another mechanism involved in leaning (e.g., a part of a lean brake mechanism 50) to the lean base 41. The lean brake mechanism 50 is a mechanism for breaking a leaning operation. The lean brake means generating a resistance force on the leaning operation to make the leaning operation less likely to occur or to reduce the lean angle. The lean bracket 49 may be a member (a member like the coupling link 48) for attaching the lower arm 44 alone.

Both the upper protruding tube 41b and the lower protruding tube 41d are positioned more downward than the upper arm 43 and more upward than the lower arm 44. This allows the lean mechanism 42 to have a reduced size in the upper-lower direction as compared to a configuration having the upper protruding tube 41b disposed more upward than the upper attaching portion 41a, for example.

The left arm 45 is rotatably attached to the left wheel 32L. To be specific, the left arm 45 is attached to the hub 32a of the left wheel 32L. The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 6. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

A layout of the tubular suspensions 11, 12, 13 will now be described with reference to FIG. 7.

The tubular suspensions 11, 12, 13 is positioned at a space in front of an axle center (an axle position, a hub hole position) of the left front wheel 31L and the right front wheel 31R. It is necessary that the tubular suspensions 11, 12, 13 is disposed so as to prevent from an interference with the left front wheel 31L and the right front wheel 31R even if the actual steering angle of the left front wheel 31L and the right front wheel 31R changes.

Figure 7:
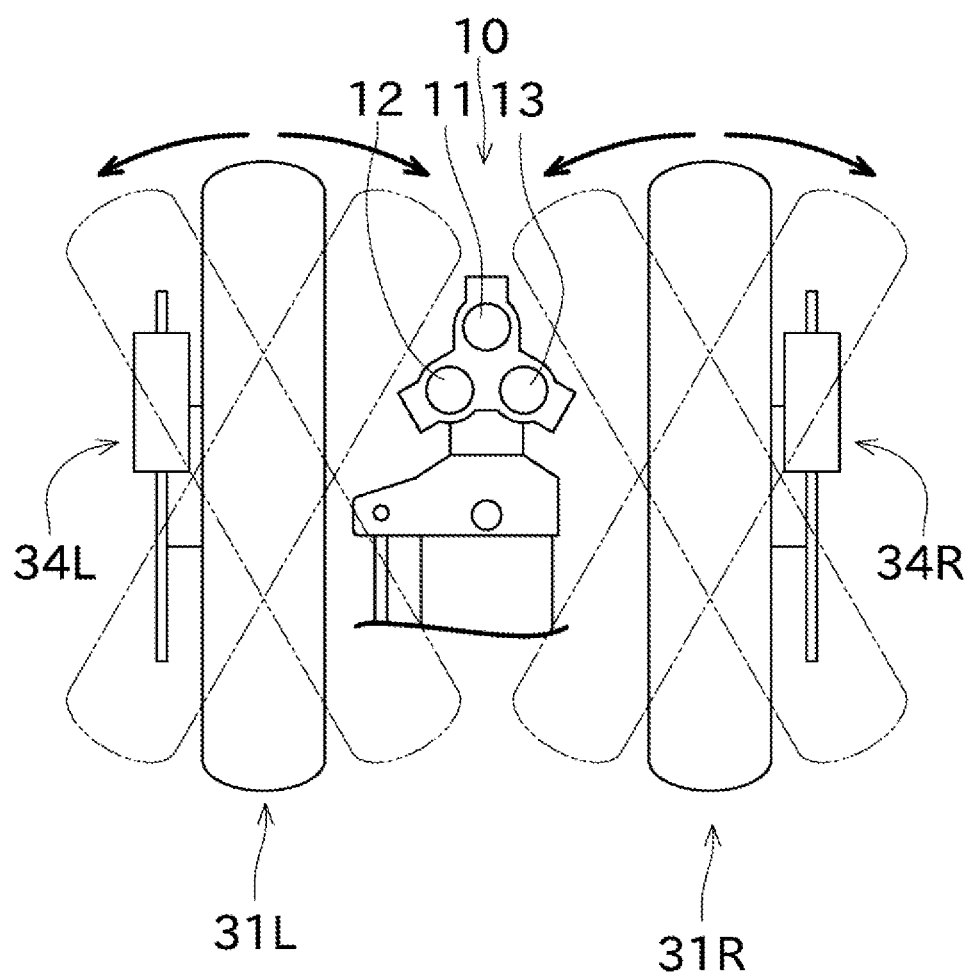
FIG. 7 shows a view illustrating a positional relationship of a movable range of the front wheels and the suspension.

FIG. 7 shows the left front wheel 31L and the right front wheel 31R by chain lines in a situation where the actual steering angle of left and right is the maximum angle. The maximum angle of the actual steering angle will now be described. When the steering handle 7 is rotated, the steering handle 7 or a member that rotates integrally with it contacts another member, preventing the steering handle 7 from rotating any further. The actual steering angles of the left front wheel 31L and the right front wheel 31R in this state are the "maximum angle of the actual steering angle".

Thus, as shown in FIG. 7, the space in which tubular suspensions 11, 12, 13 can be placed in the front gets smaller in size in the vehicle width direction as it gets closer.

Thus, the tubular suspensions 11, 12, 13 of this embodiment are disposed as follows. That is, the first tubular suspension 11 is positioned at the first row, in other words the front end. The first tubular suspension 11 is positioned so as to overlap the center in the vehicle width direction. The second tubular suspension 12 and the third tubular suspension 13 are positioned at the second row that is rear of the first row The second tubular suspension 12 and the third tubular suspension 13 are symmetric the center in the vehicle width direction.

Accordingly, the tubular suspension 11, 12, 13 can be efficiently disposed so as to prevent from the interference with the left front wheel 31L and the right front wheel 31R.

The layout may be different from that of this embodiment as long as the interference with the left front wheel 31L and the right front wheel 31R. For example, the layout may have two tubular suspensions located in the first row and one tubular suspension located in the second row.

If the tubular suspensions 11, 12, 13 are disposed in a single row, they would be highly resistant to forces applied in one particular direction, but weakly resistant to forces applied in other directions. Thus, it is preferable that the tubular suspension 11, 12, 13 are not disposed in a single row. For example, by differentiating a row direction of the first tubular suspension 11 and the second tubular suspension 12 from a row direction of the first tubular suspension 11 and the third tubular suspension 13, the tubular suspensions 11, 12, 13 are not disposed in a single row.

The tubular suspensions may be disposed in a single row if sufficient strength can be ensured. If there are two tubular suspensions, the tubular suspensions are necessarily disposed in a single row. The number of tubular suspensions may be four or more.

A relationship between the suspension 10 and the lean mechanism 42 will now be described.

As described above, the left front wheel 31L and the right front wheel 31R are attached to the lean mechanism 42 corresponding to the first mechanism. The lean mechanism 42 are attached to the lower coupling base 16 of the suspension 10 via the lean base 41. Thus, a shock-absorbing mechanism of the suspension 10 of this embodiment is not individually disposed on the left and right. That is, the suspension 10 absorbs vibrations transmitted from the left front wheel 31L and the right front wheel 31R collectively.

If the shock-absorbing mechanisms are disposed individually, a tubular suspension (front forks) is attached to a left and right front wheel, respectively. In this case, a size of a front portion of a leaning vehicle in the vehicle width direction is likely to be large. Depending on an attachment method of the tubular suspension, a configuration may be complicate or heavier.

On the other hand, in this embodiment, since the shock-absorbing mechanism are not individually disposed left and right, the suspension 10 can be disposed the center in the vehicle width direction only. Thus, the size of the front portion of the leaning vehicle in the vehicle width direction 1 can be small. Moreover, it may also simplify the configuration and reduce weight. In general, in a configuration where the shock-absorbing mechanism is not individually on the left and right, there is a concern that not only the left front wheel but also the right front wheel may leave the road surface if, for example, only the left front wheel steps on a large stone. However, in this embodiment, the left front wheel 31L and the right front wheel 31R are connected to the lean mechanism 42, so the right front wheel 31R can remain in contact with the road surface in this situation.

In this embodiment, the left front wheel 31L and the right front wheel 31R are connected by the lean mechanism 42, and the lean mechanism 42 is attached to the suspension 10. Instead of this configuration, the left front wheel 31L and the right front wheel 31R may be connected by a member except the lean mechanism 42, the member may be attached to the suspension 10.

A configuration in which shock-absorbing mechanism is not disposed individually on left and right can be applied to other than front fork type suspensions. For example, the spring 10c may not built-in-type, and the spring 10c may be located outside of the tubular body 10a and the sliding body 10b. In this case, the spring 10c is connected to an appropriate mechanism so that the spring 10c extends and retracts in response to the relative movement (sliding) of the tubular body 10a and the sliding body 10b. Instead of a suspension with a configuration in which the sliding body 10b slides during shock-absorbing, a suspension with a configuration in which the arm moves up and down (rotates up and down) during shock-absorbing may be used.

Figure 8:
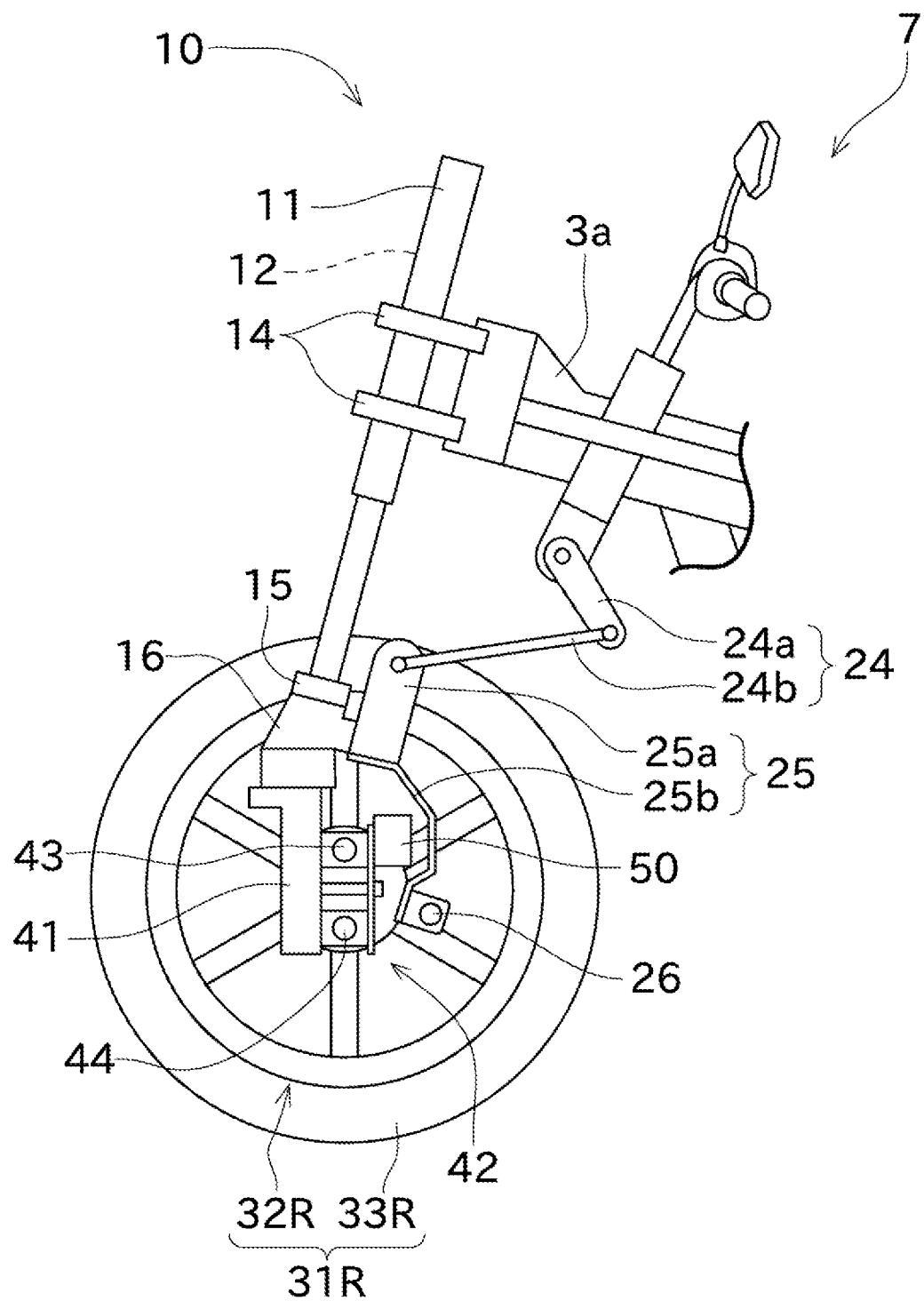
FIG. 8 shows a side view of a front portion of a leaning vehicle according to a second embodiment.

A leaning vehicle 1 according to the second embodiment will now be described with reference to FIG. 8 and FIG. 9.

The description of the second embodiment will mainly deal with configurations different from the first embodiment. In the description of the second embodiment, members identical or similar to those of the first embodiment are given the same reference signs on the drawings, and their descriptions may be omitted or simplified.

The suspension 10 of the first embodiment includes the three tubular suspensions 11, 12, and 13. A suspension 10 of the second embodiment, on the other hand, includes two tubular suspensions 11 and 12. The first tubular suspension 11 and the second tubular suspension 12 are disposed side by side in the vehicle width direction.

In the first embodiment, the rotational steering force of the steering handle 7 is transmitted to the pantograph mechanism 24 via the first steering part 23. In the second embodiment, on the other hand, a rotational steering force of a steering handle 7 is directly transmitted to a pantograph mechanism 24. Thus, the pantograph mechanism 24 is attached to a member that rotates coaxially with the steering handle 7.

Thus, the rotation axis of the steering handle 7 and the rotation axis of the second steering part 25 is not same. Accordingly, a distance of the maneuvering angle (a rotation angle of the steering handle 7) and the actual steering angle (a rotation angle of the left front wheel 31L and the right front wheel 31R) is slightly generated. However, the configuration can be simplified by omitting the first steering part 23. The difference between the maneuvering angle and the actual steering angle is absorbed, for example, by elastic deformation of the pantograph mechanism 24. In particular, the second link portion 24b of the second embodiment is rod-shaped and easily deformable. The second link portion 24b may have a mechanism to adjust its length.

In the second embodiment, a lower coupling base 16 does not cross a second steering part 25, and a lean base 41 is positioned immediately below the lower coupling base 16. An upper arm 43 and a lower arm 44 are positioned more rearward than the lean base 41. With this, a steering rod 26 and a lean brake mechanism 50 are also positioned more rearward than the lean base 41. In this manner, arranging members involved in leaning and steering on one side (on the front side in the first embodiment, and on the rear side in the second embodiment) of the lean base 41 allows the members involved in leaning and steering to be arranged collectively.

Figure 9:
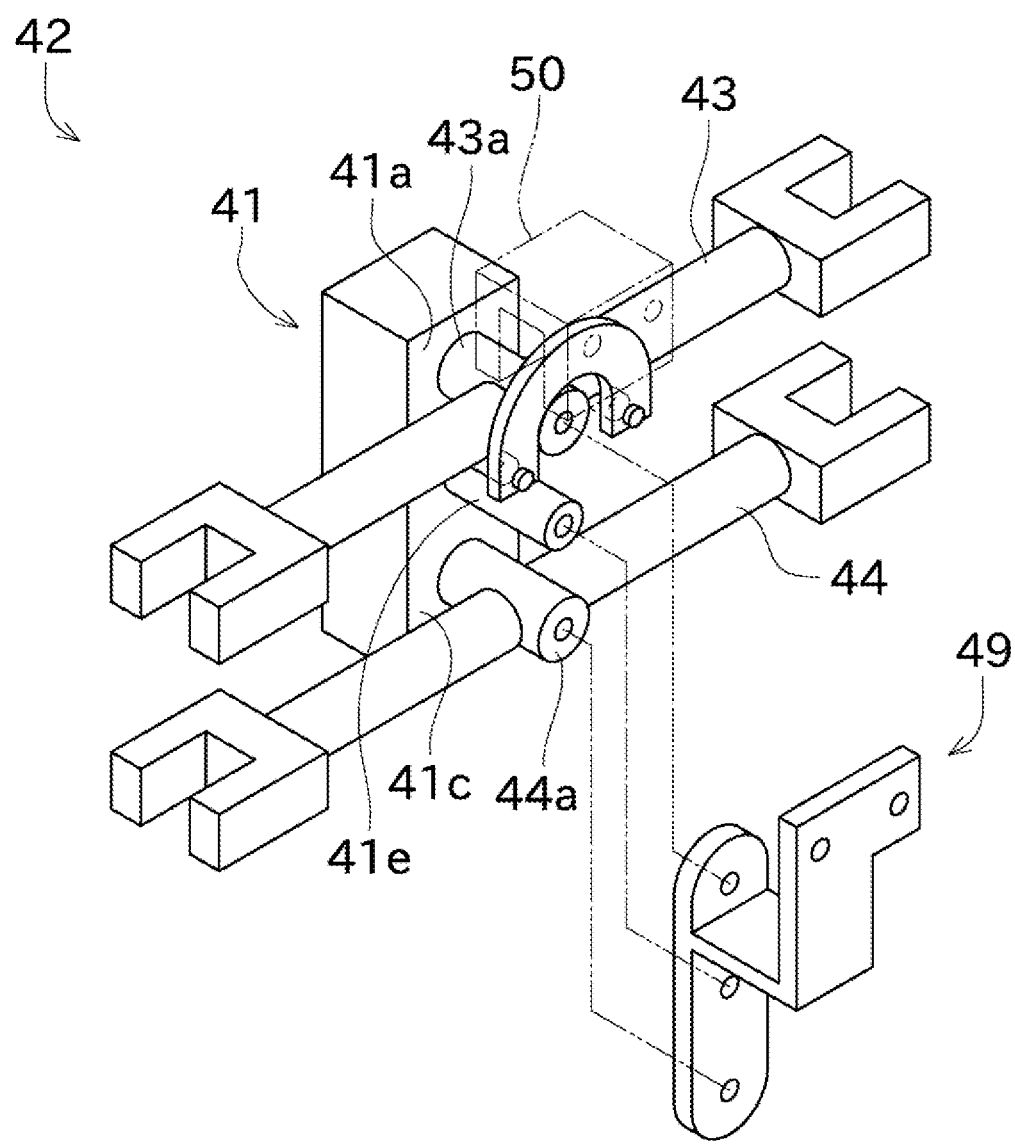
FIG. 9 shows a perspective view of a lean mechanism according to the second embodiment.

As shown in FIG. 9, a structure for attaching the upper arm 43 and the lower arm 44 is also different from that of the first embodiment. In the first embodiment, the upper attaching portion 41a and the lower attaching portion 41c of the lean base 41 are at different positions in the front-rear direction. In the second embodiment, an upper attaching portion 41a and a lower attaching portion 41c are at the same position in the front-rear direction. Accordingly, the upper arm 43 and the lower arm 44 are at the same position in the front-rear direction.

Although in the first embodiment, the lean base 41 has the upper protruding tube 41b and the lower protruding tube 41d, both of their functions is provided by a middle protruding tube 41e in the second embodiment. Thus, a lean bracket 49 attaches an upper fulcrum portion 43a, the middle protruding tube 41e, a lower fulcrum portion 44a, and the lean brake mechanism 50 collectively to the lean base 41.

As thus far described, the leaning vehicle 1 according to any of the foregoing embodiments includes the vehicle body 2, the left front wheel 31L, the right front wheel 31R, the lean mechanism 42, and the suspension 10. The left front wheel 31L is positioned on the first side (left side) in the vehicle width direction. The right front wheel 31R is positioned on the second side (right side) opposite to the first side in the vehicle width direction. The lean mechanism 42 connects the left front wheel 31L and the right front wheel 31R and vertically vibrates integrally with both of the left front wheel 31L and the right front wheel 31R. The suspension 10 is positioned so as to overlap the center of the vehicle in the vehicle width direction, connects the lean mechanism 42 to the vehicle body 2, and reduces vibration transmitted from a road surface to the vehicle body 2 via the left front wheel 31L and the right front wheel 31R.

This simplifies the structure compared to a configuration in which the suspension 10 is attached separately to the left front wheel 31L and the right front wheel 31R. Since the lean mechanism 42 exists between the left front wheel 31L, right front wheel 31R and the suspension 10, the suspension 10 can be disposed so as to overlap the center of the vehicle in the vehicle width direction, and thus a space near the front wheels can be secure.

In the leaning vehicle 1 according to any of the foregoing embodiments, the suspension 10 includes the tubular body 10a, the sliding body 10b, and the spring 10c. The sliding body 10b is inserted into the tubular body 10a and slidable relative to the tubular body 10a. The spring 10c extends or retracts by sliding the sliding body 10b.

Accordingly, since the tubular body 10a and the sliding body 10b is an elongated shape, the space around the axis of the tubular body 10a and the sliding body 10b can be large.

In the leaning vehicle 1 according to any of the foregoing embodiments, the suspension 10 includes a plurality of the tubular suspension 11, 12, 13. The tubular suspensions 11, 12, 13 consist of a pair of the tubular body 10a, the sliding body 10b, and the spring 10c, and the position of the axis of the spring 10c and the position of the axis of the tubular body 10a is same. The plurality of the tubular body 10a are connected each other and the plurality of the sliding body 10b are connected each other.

Since the position of the axes of the spring 10c and the tubular body 10a are same, the suspension 10 can be compact, and then the space around the suspension 10 can be large. By including the tubular body 10a and the like and connecting them each other, the plurality of sliding bodies 10b can slide integrally or relative rotating of the sliding body 10b and tubular body 10a can be prevented.

In the leaning vehicle 1 according to any of the foregoing embodiments, the suspension 10 includes the first tubular suspension 11, the second tubular suspension 12, and the third tubular suspension 13 as the tubular suspension. The row direction of the first tubular suspension 11 and the second tubular suspension 12 is different from the row direction of the first tubular suspension 11 and the third tubular suspension 13.

This allows for higher strength in various directions compared to a configuration with a single row of tubular suspensions 11, 12, 13.

In the leaning vehicle 1 according to any of the foregoing embodiments, at least part of the suspension 10 is positioned forward the axle center of the left front wheel 31L or the right front wheel 31R. At least part of the suspension 10 overlaps the left front wheel 31L or the right front wheel 31R in the side view. The number of the tubular suspensions positioned in the first row that is the most forward row (one in the first embodiment) is less than the number of the tubular suspensions positioned in the second row that is behind the first row (two in the first embodiment).

This allows the space (front narrow space) to prevent interference in situations where the actual steering angle of the left front wheel 31L and right front wheel 31R is changed, and the tubular suspensions 11, 12, 13 can be disposed by effectively utilizing the space.

In the leaning vehicle 1 according to any of the foregoing embodiments, the first mechanism is the lean mechanism 42 that causes the left front wheel 31L and the right front wheel 31R to lean about the front-rear direction as a rotation center when the vehicle body 2 leans about the front-rear direction as a rotation center.

Since the lean mechanism 42 has not only the function for the leaning operation but also the function for connecting the left front wheel 31L and the right front wheel 31R to the suspension 10, thus reducing the number of parts. The lean mechanism 42 can be disposed in an space secured near the left front wheel 31L and the right front wheel 31R.

While some preferred embodiments of the present invention have been described above, the configurations described above may be modified, for example, as follows.

Features of the first and second embodiments described above may be combined in appropriate manners. For example, the number of tubular suspensions, the lean mechanism 42, or the like, illustrated in the second embodiment may be applicable to the first embodiment. The same is true for other features.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride. In addition, the present invention can be applicable to vehicles except leaning vehicles.

REFERENCE SIGNS LIST

1 leaning vehicle (vehicle)
2 vehicle body
7 steering handle
10 suspension
23 first steering part
24 pantograph mechanism
25 second steering part
31L left front wheel (first front wheel)
31R right front wheel (second front wheel)
32L left wheel
32R right wheel
42 lean mechanism (first mechanism)
50 lean brake mechanism

The invention claimed is:
1. A vehicle, comprising:
a vehicle body;
a first front wheel positioned on a first side in a vehicle width direction;
a second front wheel positioned on a second side opposite to the first side in the vehicle width direction;
a first mechanism connecting the first front wheel and the second front wheel and vertically vibrating integrally with both of the first front wheel and the second front wheel;
a suspension positioned so as to overlap a center of the vehicle in the vehicle width direction, connects the first mechanism to the vehicle body, and reduces vibration transmitted from a road surface to the vehicle body via the first front wheel and the second front wheel; and
a lean base extending downward from the suspension and supporting the first mechanism, the lean base coupling a longitudinal center of an upper arm of the first mechanism to a longitudinal center of a lower arm of the first mechanism.

2. The vehicle according to claim 1, wherein the suspension includes:
   a tubular body,
   a sliding body inserted into the tubular body and slidable relative to the tubular body, and
   a spring extending or retracting by sliding the sliding body.

3. The vehicle according to claim 1, wherein the suspension has a plurality of tubular suspensions, wherein each of the plurality of tubular suspensions includes a tubular body, a sliding body, and a spring that are disposed in pairs, and a position of an axis of the spring and a position of an axis of the tubular body is same, and wherein a plurality of the tubular body are connected to each other and the plurality of the sliding body are connected to each other.

4. The vehicle according to claim 3, wherein the plurality of tubular suspensions includes a first tubular suspension, a second tubular suspension, and a third tubular suspension, and wherein a row direction of the first tubular suspension and the second tubular suspension is different from a row direction of the first tubular suspension and the third tubular suspension.

5. The vehicle according to claim 4, wherein at least part of the suspension is positioned forward of an axle center of the first front wheel or the second front wheel, wherein at least part of the suspension overlaps the first front wheel or the second front wheel in a side view, and wherein the number of the tubular suspensions positioned in a first row that is the most forward row is less than the number of the tubular suspensions positioned in a second row that is behind the first row.

6. The vehicle according to claim 3, wherein regarding a connection between the tubular body and the sliding body, an upper connection position is positioned in a height range that overlaps with a front frame in a vertical direction and a lower connection position is positioned in a height range that overlaps with the front wheels in the vertical direction.

7. The vehicle according to claim 1, wherein the first mechanism is a lean mechanism causes the first front wheel and the second front wheel to lean about a front-rear direction as a rotation center when the vehicle body leans about the front-rear direction as a rotation center.

8. The vehicle according to claim 1, wherein an upper portion of the suspension is fixed to a vehicle body frame that is positioned forward of a steering handle.

* * * * *